United States Patent
Vyas et al.

(10) Patent No.: US 11,637,889 B2
(45) Date of Patent: *Apr. 25, 2023

(54) CONFIGURATION RECOMMENDATION FOR A MICROSERVICE ARCHITECTURE

(71) Applicant: Red Hat, Inc., Raleigh, NC (US)

(72) Inventors: Jay Vyas, Boston, MA (US); Huamin Chen, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/564,452

(22) Filed: Sep. 9, 2019

(65) Prior Publication Data

US 2020/0007613 A1 Jan. 2, 2020

Related U.S. Application Data

(63) Continuation of application No. 15/489,266, filed on Apr. 17, 2017, now Pat. No. 10,412,154.

(51) Int. Cl.
*H04L 29/08* (2006.01)
*G06F 9/445* (2018.01)
(Continued)

(52) U.S. Cl.
CPC .......... *H04L 67/10* (2013.01); *G06F 9/44505* (2013.01); *G06F 9/45533* (2013.01);
(Continued)

(58) Field of Classification Search
None
See application file for complete search history.

(56) References Cited

U.S. PATENT DOCUMENTS 10,417,593 B1 * 9/2019 Norbeck, Jr. ....... G06F 16/3328
10,511,481 B1 * 12/2019 Castellanos ......... H04L 41/0883
(Continued)

FOREIGN PATENT DOCUMENTS

CN 105933448 A 9/2016

OTHER PUBLICATIONS

Divyanand Malavalli, Sivakumar Sathappan, Scalable Microservice Based Architecture for Enabling DMTF Profiles, Nov. 9-10, 2015, https://www.dmtf.org/sites/default/files/DCM15_ScalableMicroserviceDMTF_Profiles.pdf.
(Continued)

*Primary Examiner* — Chris Parry
*Assistant Examiner* — Abderrahmen Chouat
(74) *Attorney, Agent, or Firm* — Haynes and Boone, LLP

(57) ABSTRACT

An example method of providing a configuration for a multitier microservice architecture includes receiving a configuration request from a user for a configuration that satisfies a set of conditions in a cloud environment. The method also includes searching a configuration data store for the configuration that matches the set of conditions. The configuration specifies a first container and a second container, the first container sends a first communication to the second container, and the second container sends a second communication responsive to the first communication to the first container. The method further includes in response to finding the configuration that matches the set of conditions: sending an allocation request to a cloud provider for allocation of the configuration in the cloud environment and providing a first identifier (ID) that identifies the first container and a second ID that identifies the second container to the user.

14 Claims, 6 Drawing Sheets

(51) Int. Cl.
  *H04L 12/14* (2006.01)
  *H04L 12/24* (2006.01)
  *H04L 67/10* (2022.01)
  *H04L 41/5051* (2022.01)
  *G06F 9/455* (2018.01)
  *H04L 41/50* (2022.01)

(52) U.S. Cl.
  CPC .......... *G06F 9/45558* (2013.01); *H04L 12/14* (2013.01); *H04L 41/5051* (2013.01); *G06F 2009/4557* (2013.01); *G06F 2009/45562* (2013.01); *G06F 2009/45587* (2013.01); *H04L 41/5096* (2013.01)

(56) References Cited

U.S. PATENT DOCUMENTS

| | | | | |
|---|---|---|---|---|
| 10,528,367 | B1* | 1/2020 | Liu | G06F 9/4498 |
| 2009/0112780 | A1* | 4/2009 | Chen | G06F 11/3409 |
| | | | | 706/19 |
| 2010/0299437 | A1 | 11/2010 | Moore | |
| 2012/0016721 | A1* | 1/2012 | Weinman | G06Q 30/02 |
| | | | | 705/7.35 |
| 2013/0332614 | A1* | 12/2013 | Brunk | G06F 3/067 |
| | | | | 709/226 |
| 2014/0201218 | A1* | 7/2014 | Catalano | G06F 8/60 |
| | | | | 707/748 |
| 2016/0124742 | A1 | 5/2016 | Rangasamy et al. | |
| 2016/0164727 | A1* | 6/2016 | Cimprich | H04L 47/808 |
| | | | | 709/220 |
| 2016/0205518 | A1 | 7/2016 | Patel | |
| 2016/0232624 | A1 | 8/2016 | Goldberg et al. | |
| 2016/0345176 | A1 | 11/2016 | DeWitt et al. | |
| 2017/0024396 | A1* | 1/2017 | Adarsh | H04L 67/10 |
| 2017/0041406 | A1 | 2/2017 | Lawson | |
| 2017/0052772 | A1* | 2/2017 | Chen | G06F 9/45558 |
| 2017/0201569 | A1* | 7/2017 | Fu | G06F 9/45558 |
| 2017/0235649 | A1 | 8/2017 | Shah | |
| 2018/0088926 | A1* | 3/2018 | Abrams | H04L 67/34 |
| 2018/0113734 | A1* | 4/2018 | Yamato | H04L 67/10 |
| 2019/0215239 | A1* | 7/2019 | Li | H04L 41/5009 |

OTHER PUBLICATIONS

Srivatsan Ramanujam, Regunathan Radhakrishnan, Jin Yu, Kaushik Das, Operationalizing Data Science Models on the Pivotal Stack, Aug. 11, 2016, http://engineering.pivotal.io/post/operationalizing-datascience-models-on-pivotal-stack/.

[Quick Start] Building a Simple Recommendation Engine with QBit (CallBack Blocking), Jun. 8, 2015, https://github.com/advantageous/qbit/wiki/%5BQuick-Start%5D-Building-a-simple-recommendation-engine-with-QBit-(CallBack-Blocking).

IoE: Integration Microservices—Machine Learning, Dec. 17, 2015, www.megatris.com:90/megatriscomp/?upf=dl&id=265.

* cited by examiner

CONFIGURATION RECOMMENDATION FOR A MICROSERVICE ARCHITECTURE

CROSS REFERENCE TO RELATED APPLICATIONS

This application is a continuation of U.S. application Ser. No. 15/489,266, filed Apr. 17, 2017, entitled "Configuration Recommendation for a Microservice Architecture," which is incorporated by reference in its entirety herein.

BACKGROUND

The present disclosure generally relates to computing devices, and more particularly to allocating a configuration that supports a microservice architecture.

A platform may allow developers to separate their applications from the infrastructure and treat the infrastructure like a managed application. An application may be decomposed into "microservices" using one or more containers. A container is a self-contained execution environment and offers software that creates virtual environments mimicking a full virtual machine. A container is an isolated processing space that can exist on top of a virtual machine or on top of actual hardware.

BRIEF SUMMARY

Methods, systems, and techniques for providing a configuration for a multitier microservice architecture are provided.

An example method of providing a configuration for a multitier microservice architecture includes receiving a configuration request from a user for a configuration that satisfies a set of conditions in a cloud environment. The method also includes searching a configuration data store for the configuration that matches the set of conditions. The configuration specifies a first container and a second container, the first container sends a first communication to the second container, and the second container sends a second communication responsive to the first communication to the first container. The method further includes in response to finding the configuration that matches the set of conditions: (i) sending an allocation request to a cloud provider for allocation of the configuration in the cloud environment, and (ii) providing a first identifier (ID) that identifies the first container and a second ID that identifies the second container to the user.

An example system for providing a configuration for a multitier microservice architecture includes a configuration data store that stores one or more configurations. Each configuration specifies one or more containers located at a first tier of a multitier microservice architecture and one or more containers located at a second tier of the multitier microservice architecture. The system also includes a communications module that receives a configuration request from a user for a configuration that satisfies a set of conditions in a cloud environment. The configuration specifies a first container located at the first tier and a second container located at the second tier, the first container sends a first communication to the second container, and the second container sends a second communication responsive to the first communication to the first container. The system further includes a database management server that searches the configuration data store for the configuration that matches the set of conditions. The system also includes a container allocator that in response to finding the configuration that matches the set of conditions: (i) sends an allocation request to a cloud provider for allocation of the configuration in the cloud environment, and (ii) provides a first ID that identifies the first container and a second ID that identifies the second container to the user.

An example machine-readable medium includes a plurality of machine-readable instructions that when executed by one or more processors is adapted to cause the one or more processors to perform a method including: receiving a configuration request from a user for a configuration that satisfies a set of conditions in a cloud environment; searching a configuration data store for the configuration that matches the set of conditions, the configuration specifying a first container and a second container, where the first container sends a first communication to the second container, and the second container sends a second communication responsive to the first communication to the first container; and in response to finding the configuration that matches the set of conditions: (i) sending an allocation request to a cloud provider for allocation of the configuration in the cloud environment; and (ii) providing a first ID that identifies the first container and a second ID that identifies the second container to the user.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
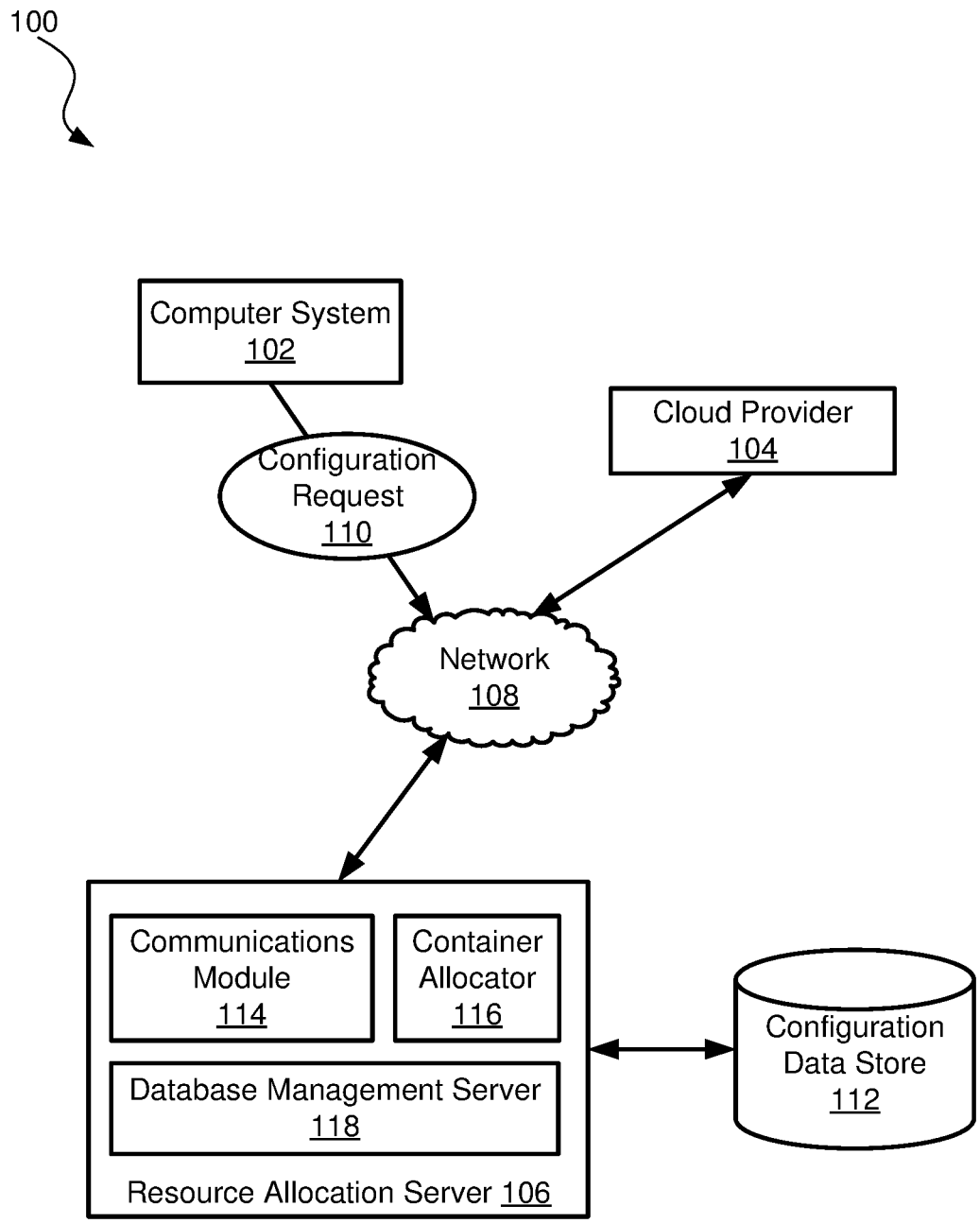
FIG. 1 is a diagram illustrating an example system for providing one or more configurations for a multitier microservice architecture to a user.

I. Overview
II. Example Computer Architecture
III. Example Process Flow
IV. Example Methods I. Overview It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A monolithic model of application architecture may involve building a single integrated application containing the majority of features and functions. The logic for handling a request may run in a single process, allowing the use of basic features to divide the application into classes, functions, and namespaces. The application may be horizontally scaled by running many instances behind a load balancer. Change cycles of a monolithic model are tied together such that a change made to a small part of the application may result in the rebuild and deployment of the entire application. Over time, it may be difficult to maintain a healthy modular structure because changes made to one module may affect another module within that module. Additionally, the scaling of the application may result in the scaling of the entire application rather than parts of it that use more resources. Accordingly, an application built using the monolithic model may have difficulty remaining agile, flexible, and scalable.

Some problems of the monolithic model of application architecture may be solved by deploying a microservice model of application architecture. The microservice model of application architecture may be more ideal than a monolithic model if support for a range of platforms and devices (e.g., spanning Web, mobile, Internet of Things, and wearables) is desired or if the application provider is unsure what types of devices will use the application. An application may be decomposed into a set of smaller, interconnected services, which may be referred to as microservices. A service typically implements a set of distinct features or functionality (e.g., receiving a user request or retrieving data from or storing data into a database). In an example, a microservice may expose an application programming interface (API) that is consumed by another microservice or by the application's clients. In another example, a microservice may implement a Web user interface. Each instance may be run in a cloud virtual machine or a container.

Unlike a virtual machine, a container is designed to be pared down to the minimal viable pieces for executing whatever the container is designed to do, rather than packing multiple functions into the same virtual or physical machine. A container is an isolated processing space that can exist on top of a virtual machine or on top of actual hardware. A container may offer software that creates virtual environments mimicking a full virtual machine, but may be viewed as a lightweight virtual machine that is used to create environments. A container encapsulates discrete components of application logic provisioned with the minimal resources for performing its job.

Additionally, a microservice architecture may have multiple tiers and may be highly re-usable. For example, a configuration may include a first container (e.g., Web server) located at a first tier and a second container (e.g., Web server script module) located at a second tier of the multitier microservice architecture. In an example, a user may desire a configuration having a throughput of 200 queries per second and falling within a budget of $0.25 per hour, but not know what the particular configuration should be in order to satisfy these conditions. For example, the user may be unable to ascertain how many Web servers should be allocated at the first tier and how many Web server script modules should be allocated at the second tier in order to satisfy these conditions.

A solution to the problem of a user desiring to allocate containers at multiple tiers but not knowing which particular resources to allocate and at which levels may be solved by allowing the user to specify the set of conditions and providing the user with a configuration satisfying the set of conditions. It is feasible to benchmark such reusable architectures with different compute resource profiles specifying particular configurations.

The present disclosure provides techniques for providing one or more configurations for a multitier microservice architecture. Unless specifically stated otherwise, as apparent from the following discussion, it is appreciated that throughout the description, discussions utilizing terms such as "determining," "storing," "searching," "receiving," "sending," "providing," "executing," "identifying," "populating," "applying," and "providing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

II. Example Computer Architecture

FIG. 1 is a diagram illustrating an example system 100 for providing one or more configurations for a multitier microservice architecture to a user. System 100 includes a computer system 102, a cloud provider 104, and a resource allocation server 106 coupled over a network 108. Network 108 may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Each of computer system 102 and resource allocation server 106 is coupled to hardware such as a processor for executing software (e.g., machine-readable instructions) and using or updating data stored in a memory. Hardware may include one or more processors. A "processor" may also be referred to as a "CPU" or "physical processor" herein. A processor shall refer to a device capable of executing instructions encoding arithmetic, logical, or I/O operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system and various other software applications. Hardware may also include other I/O devices.

A user may submit a configuration request 110 to resource allocation server 106, which may request the allocation of one or more physical and/or virtual resources provided by cloud provider 104 to the user. A user may use computer system 102 for submitting one or more requests for a configuration that satisfies a set of conditions in a cloud environment. In the present disclosure, reference to a user submitting a communication (e.g., configuration request) may be interpreted as the user interacting with computer system 102 to submit the communication. The user may desire to use the physical and/or virtual resources (e.g., one or more containers) offered by a cloud provider. In an example, the user submits a request by providing user input (e.g., via a keyboard or mouse input) requesting that a configuration that satisfies a set of conditions be provided by a cloud provider. In response to the user input, computer system 102 may submit configuration request 110 to resource allocation server 106, which then processes the configuration request.

Cloud computing services can provide computational capacity, data access, networking/routing and storage services via a large pool of shared resources operated by cloud provider 104. Because the computing resources are delivered over a network, cloud computing is location-independent computing, with resources being provided to end-users on demand with control of the physical resources separated from control of the computing resources. A computing resource may include networks for transfer, servers for storage, and/or applications or services for processing jobs. Cloud provider 104 may provide computing resources on an on-demand basis with the flexibility to bring the resources up or down through automation or with little intervention.

In some examples, a condition specifies a throughput that satisfies (e.g., is greater or less than) a throughput threshold. The throughput may be represented in queries per unit of time (e.g., 100 queries per second, 1,000 queries per second, etc.). In an example, the throughput satisfies the throughput threshold if the throughput is greater than 500 queries per second. In some examples, a condition specifies a payment metric that satisfies (e.g., is greater or less than) a payment threshold. The payment metric may be represented in cost per unit of time (e.g., $0.10 per hour, $0.15 per hour, etc.). In an example, the payment metric satisfies the payment threshold if the payment metric is less than $0.12 per hour.

Additionally, the configuration request may be a request for a multitier configuration specifying one or more containers located at multiple tiers of the multitier microservice architecture. A container may run one or more applications on a developer's local host, on physical or virtual machines in a data center, or in the cloud. In some examples, a configuration includes a first container and a second container, where the first container is located at a first tier of the multitier microservice architecture, and the second container is located at a second tier of the multitier microservice architecture. A container may include one or more compute resources, network resources, and/or storage resources. A compute resource may be a central processing unit (CPU) cycle or random access memory (RAM) capacity. In an example, a container includes a Web server, Web server script module, database, etc. For one or more containers, container allocator 116 may maintain a number of replicas of the respective container and may have a trigger that scales up and down the one or more replicas.

To run the application based on microservices, resource allocation server 106 may monitor, manage, and scale the different constituent parts of the application. Resource allocation server 106 maintains a configuration data store 112 that stores information on the multitier configurations provided by one or more cloud providers. Configuration data store 112 may persistently store and manage collections of data and further store information indicating whether a particular configuration will satisfy one or more of a user's conditions.

Resource allocation server 106 includes a communications module 114, a container allocator 116, and a database management server 118. Communications module 114 receives configuration request 110 from computer system 102, where configuration request 110 specifies a set of conditions. Database management server 118 searches configuration data store 112 for a configuration that matches the set of conditions. If a configuration that matches the set of conditions is found in configuration data store 112, container allocator 116 sends a request to cloud provider 104 to allocate the resources (e.g., containers) specified in the configuration. If a configuration that matches the set of conditions is not found in configuration data store 112, database management server 118 may implement techniques to identify a configuration that satisfies the set of conditions (e.g., K-nearest neighbor (KNN) model). Although resource allocation server 106 is shown as being separate from computer system 102, it should also be understood that in some examples, container allocator 116 and/or database management server 118 are/is incorporated into computer system 102.

Figure 2:
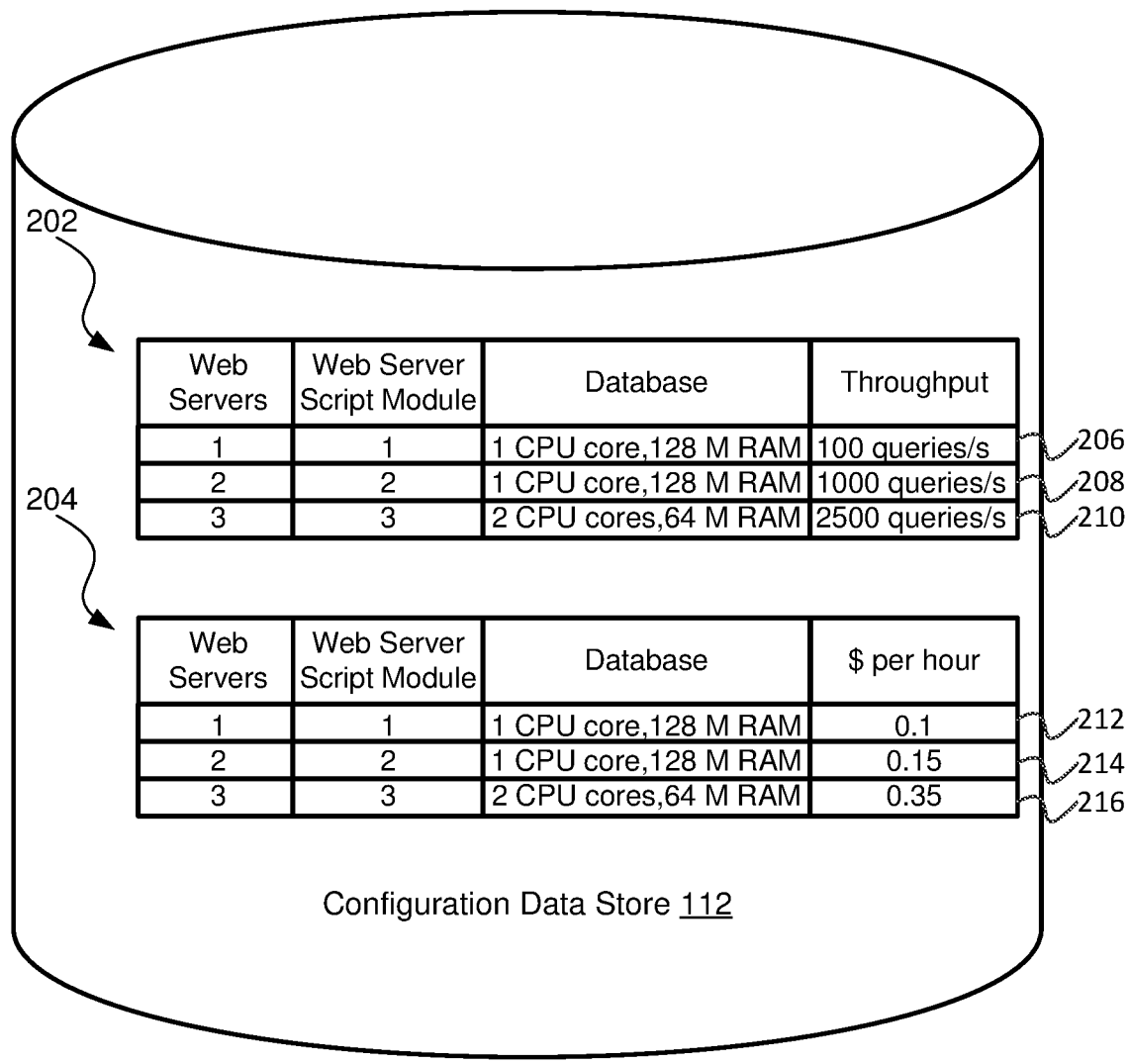
FIG. 2 is an example of a configuration data store that stores one or more entries.

FIG. 2 is an example of a configuration data store that stores one or more entries. Each entry may specify one or more containers located at multiple tiers of a multitier microservice architecture. In the example illustrated in FIG. 2, configuration data store 112 stores tables 202 and 204. Although configuration data store 112 is illustrated as being a database that stores tables, it should be understood that this is not intended to be limiting and in other examples, configuration data store 112 may include not only repositories like databases, but also simpler store types such as files, e-mails, etc. Additionally, although configuration data store 112 is illustrated as storing two tables, it should be understood that configuration data store 112 may store fewer than or more than two tables, where each table may include one or more entries.

In an example, an entry in a table specifies a multitier configuration and an indication of whether the configuration satisfies or matches one or more conditions. Each column of the table specifies a number of containers located at different tiers of the multitier microservice architecture. Tables 202 and 204 include a first column "Web servers" that specifies the number of Web servers located at a first tier of the multitier microservice architecture, a second column "Web server script module" that specifies the number of Web server script modules located at a second tier of the multitier microservice architecture, and a third column "Database" that specifies the number of databases located at a third tier of the multitier microservice architecture. Table 202 includes a fourth column "Throughput" that is represented in queries per unit of time (e.g., queries per second) and stores a value indicating the throughput of the multitier configuration specified in the entry. Table 204 includes a fourth column "$ per hour" that is represented in dollars per unit of time (e.g., dollars per hour) and stores a value indicating the cost of running the multitier configuration specified in the entry.

Entries 206 and 212 indicate that a configuration including one Web server located at the first tier, one Web server script module located at the second tier, and one database having one central processing unit (CPU) core with 128 megabytes (M) of RAM has a throughput of 100 queries per second and costs $0.10 per hour to run. Entries 208 and 214 indicate that a configuration including two Web servers located at the first tier, two Web server script modules located at the second tier, and one database having one CPU core with 128 M of RAM has a throughput of 1,000 queries per second and costs $0.15 per hour to run. Entries 210 and 216 indicate that a configuration including three Web servers located at the first tier, three Web server script modules located at the second tier, and one database having two CPU cores with each CPU core having 64 M of RAM has a throughput of 2,500 queries per second and costs $0.35 per hour to run.

In some examples, resource allocation server 106 populates data in one or more tables stored in configuration data store 112. For one or more configurations in the cloud environment, database management server 118 retrieves information regarding one or more conditions and populates a table with an entry specifying the respective configuration and the one or more conditions. Resource allocation server 106 may obtain information from cloud provider 104. In an example, resource allocation server 106 may search a Website associated with cloud provider 104 for information (e.g., throughput or payment metric information). In another example, cloud provider 104 may provide this information to resource allocation server 106 and push updated information (e.g., throughput or payment metric information) to resource allocation server 106. In an example, for one or more configurations, database management server 118 obtains a throughput for a respective configuration and populates a table with an entry specifying the respective configuration and throughput. In another example, for one or more configurations, database management server 118 obtains a payment metric for a respective configuration and populates a table with an entry specifying the respective configuration and payment metric. Database management server 118 may continue to populate and update these table entries as time passes.

III. Example Process Flow

Figure 3:
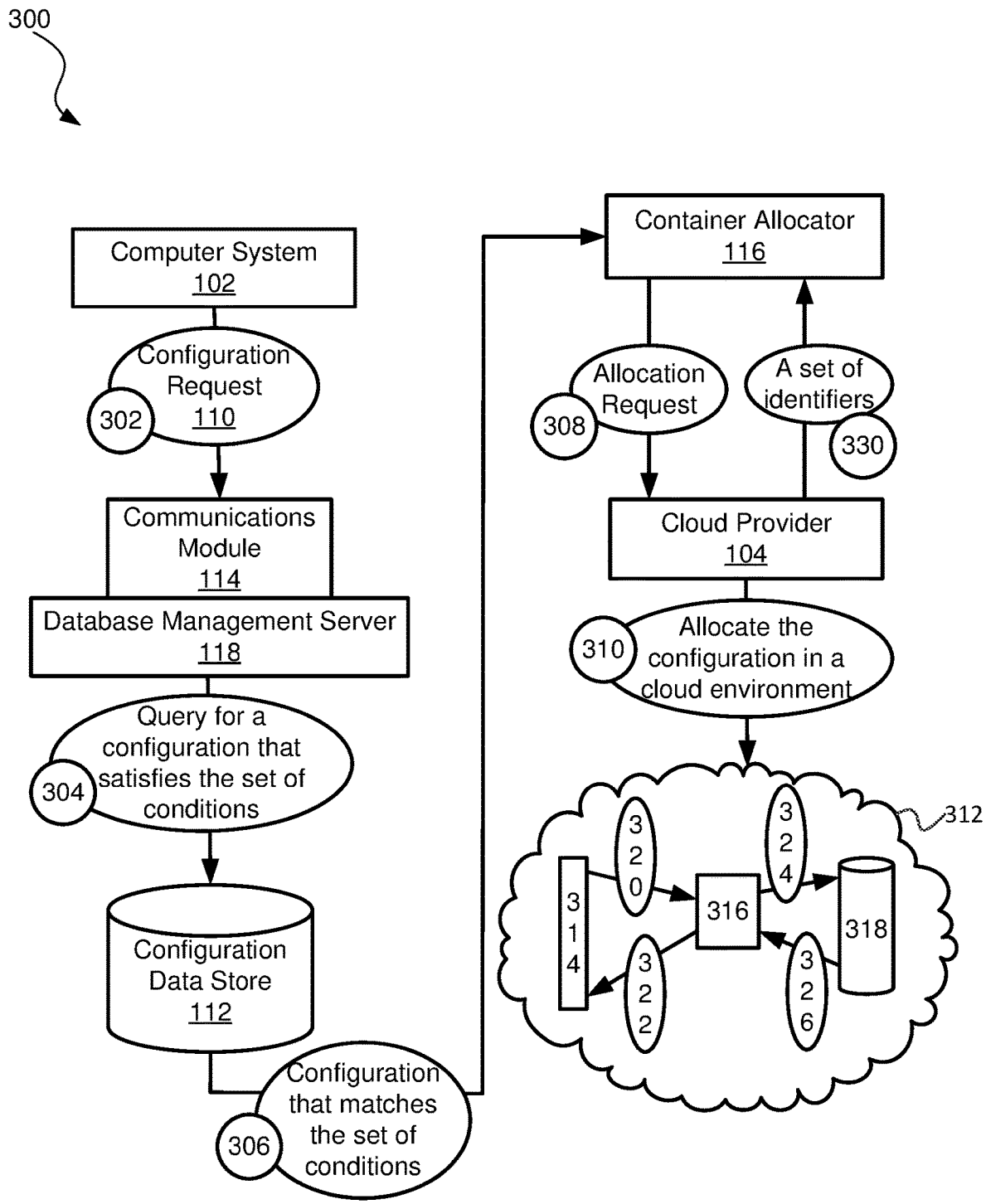
FIG. 3 is a process flow for providing a configuration for a multitier microservice architecture.

FIG. 3 is a process flow 300 for providing a configuration for a multitier microservice architecture. At action 302, computer system 102 sends configuration request 110 to communications module 114. The configuration request may be a request for a multitier configuration that satisfies a set of conditions in a cloud environment. In an example, the user or computer system 102 is associated with the set of conditions. In this example, the user or computer system 102 may specify a user ID that identifies the user such that resource allocation server 106 may determine the set of conditions based on the user ID. In an example, the user may have an account with resource allocation server 106 that specifies information about the user, the preferred throughput of the user, and/or the preferred payment metric of the user. In another example, configuration request 110 specifies the set of conditions. In this example, configuration request 110 may include or reference the set of conditions.

A user may submit configuration request 110 to resource allocation server 106 for allocation of resources in a cloud environment. In an example, the user points a browser (not shown) hosted on computer system 102 to a Website associated with resource allocation server 106 to request a configuration for a multitier microservice architecture. A multitier microservice architecture may include one or more containers located at different tiers of the multitier microservice architecture. In an example, configuration request 110 is a request for a configuration including a first set of containers located at a first tier, a second set of containers located at a second tier, and a third set of containers located at a third tier of the multitier microservice architecture. It should be understood that configuration request 110 may be a request for two or more tiers and/or a multitier configuration may also include two or more tiers (e.g., four tiers, five tiers, etc.). In an example, the user is unaware of the multiple tiers of the architecture and simply provides the set of conditions to resource allocation server 106.

Communications module 114 receives configuration request 110 and passes it to database management server 118 for processing. At action 304, database management server 118 analyzes configuration request 110 and generates a query for a configuration that matches the set of conditions for submission to configuration data store 112. Database management server 118 executes the query against configuration data store 112 and searches the data store for the configuration that matches the set of conditions. At action 306, database management server 118 finds the configuration that matches the set of conditions in configuration data store 112. At action 308, in response to finding the configuration that matches the set of conditions, container allocator 116 sends an allocation request to cloud provider 104 for allocation of the configuration in a cloud environment.

Cloud provider 104 receives the allocation request from container allocator 116. At action 310, cloud provider 104 allocates the configuration that matches the set of conditions in a cloud environment 312. Cloud provider 104 may allocate the requested resources for the user. If cloud provider 104 allocates a container for the user, cloud provider 104 may provide the user with identifying information that allows the user to access the container. In an example, the identifying information is an ID of the container (e.g., an Internet Protocol (IP) address and/or a media access control (MAC) address of the machine hosting the container), location of the container, etc. Cloud provider 104 may expose one or more interfaces, and an entity may communicate with at least one of these interfaces to control the allocation of containers. Container allocator 116 may allocate resources in a cloud environment using, for example, the interface. In some examples, cloud provider 104 exposes an API that when invoked causes cloud provider 104 to allocate resources for the configuration.

In the example illustrated in FIG. 3, responsive to the allocation request from container allocator 116, cloud provider 104 may allocate a configuration including a first container 314 located at a first tier, a second container 316 located at a second tier, and a third container 318 located at a third tier of the multitier microservice architecture. In some examples, the first tier includes one or more Web servers that handle one or more incoming Web requests, the second tier includes business logic and generates a query in accordance with applying the business logic to a Web request of the one or more Web requests, and the third tier includes a database that handles structured data storage and stores data persistently.

First container 314 may send a first communication 320 to second container 316, and second container 316 may send a second communication 322 responsive to the first communication 320 to first container 314. Additionally, second container 316 may send a third communication 324 to third container 318, and third container 318 may send a fourth communication 326 responsive to third communication 324 to second container 316. In an example, first container 314 includes a Web server, second container 316 includes a Web server script module, and third container 318 includes a database. In this example, the Web server may handle incoming user requests and send a message based on a user request (e.g., first communication 320) to the Web server script module. The Web server script module may receive the message, execute business logic, and generate a query in accordance with applying the business logic to the Web request. In an example, the Web server script module transforms the Web request into a query (e.g., third communication 324) for submission against the database.

The database retrieves the query, finds the requested data, and sends a result of the query (e.g., fourth communication 326) to the Web server script module. The Web server script module processes the query result and sends a communication based on the query result (e.g., second communication 322) to the Web server, which then forwards the result to the user. Third communication 324 may be based on first communication 320, fourth communication 326 may be based on first communication 320 and responsive to third communication 324, and second communication 322 may be based on first communication 320, third communication 324, and fourth communication 326 and responsive to the user's request.

At action 330, cloud provider 104 provides a set of IDs to container allocator 116, which may then provide the set of IDs to the user. In an example, the set of IDs includes a first ID that identifies first container 314, a second ID that identifies second container 316, and a third ID that identifies third container 318. The set of IDs identifies the containers allocated based on configuration request 110. Additionally, the user is able to use these IDs for usage of the containers.

It should be understood that additional actions may be performed before, during, or after actions 302, 304, 306, 308, 310, and/or 320 discussed above. Additionally, it should be understood that although the above example depicts cloud provider 104 as allocating three containers, it should be understood that the configuration request may be a request to configure multiple containers, where one or more containers are located at different tiers relative to each other in the configuration.

IV. Example Methods

Figure 4:
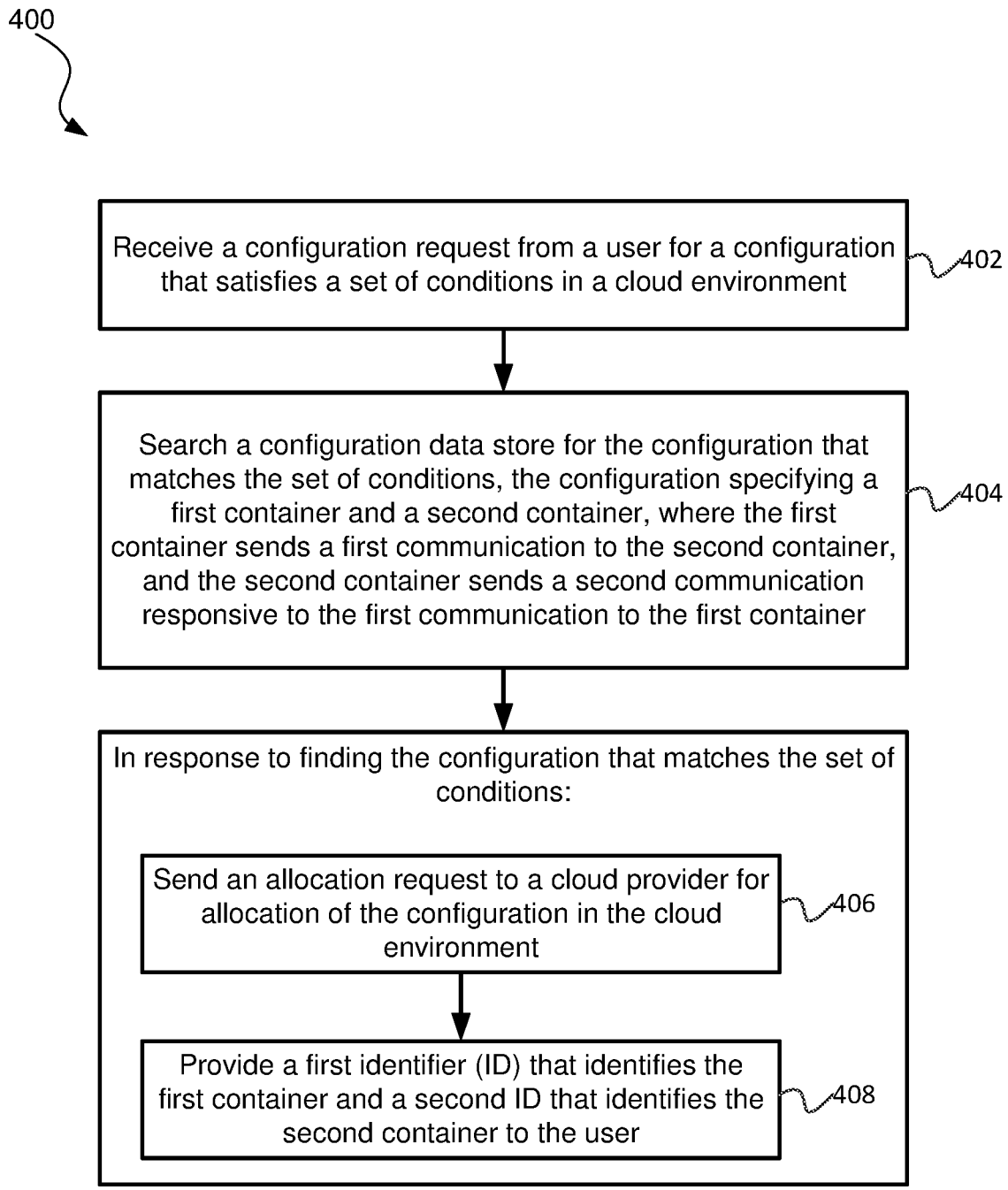
FIG. 4 is a flowchart illustrating an example method of providing a configuration for a multitier microservice architecture.

FIG. 4 is a flowchart illustrating an example method 400 of providing a configuration for a multitier microservice architecture. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 400 may be performed on system 100 illustrated in FIG. 1. The order of the actions described below may also be performed according to alternative orderings. In yet other examples, additional actions may be added and actions that are described may be removed.

Method 400 includes blocks 402, 404, 406, and/or 408. In block 402, communications module 114 receives configuration request 110 from a user for a configuration that satisfies a set of conditions in cloud environment 312. In block 404, database management server 118 searches a configuration data store 112 for the configuration that matches the set of conditions. In response to finding the configuration that matches the set of conditions, blocks 406 and 408 may be executed. In block 406, container allocator 116 sends an allocation request to cloud provider 104 for allocation of the configuration in cloud environment 312. The configuration specifies first container 314 and second container 316, where first container 314 sends first communication 320 to second container 316, and second container 316 sends second communication 322 responsive to first communication 320 to first container 314. It may be unnecessary for the user to request the particular containers (e.g., first container 314 and second container 316) that are allocated. Rather, resource allocation server 106 may be able to determine, based on the set of conditions, the configuration to be allocated by cloud provider 104. In block 408, container allocator 116 provides a first ID that identifies first container 314 and a second ID that identifies second container 316 to the user. Container allocator 116 may receive the first and second IDs from cloud provider 104.

It is understood that additional blocks may be performed before, during, or after blocks 402, 404, 406, and/or 408 discussed above. For example, before sending the allocation request, container allocator 116 may provide the configuration information to the user and request approval to send the allocation request. The configuration information may include the number of containers and specify their tiers, the estimated cost of the configuration run, etc. If the user approves of the configuration, container allocator 116 sends the allocation request. If the user does not approve of the configuration, container allocator 116 may apply a KNN model on a set of configurations stored in configuration data store 112 to find another configuration that matches or satisfies the set of conditions and may request approval from the user to send an allocation request for the respective configuration.

In another example, if cloud provider 104 does not have the configuration requested in the allocation request available for allocation, cloud provider 104 may send an error message to resource allocation server 106. For example, cloud provider 104 may be unable to provide the first container to the user. In response to the error message, database management server 118 may search configuration data store 112 for another configuration that matches the set of configurations specified in configuration request 110, where the configuration does not include the unavailable resource. In an example, cloud provider 104 may not have a database with one CPU core having 128 M RAM available, but may have a database with two CPU cores, each having 64 M RAM. In response to the error message, database management server 118 may apply the KNN model on a set of configurations stored in configuration data store 112 to find a configuration that satisfies the set of conditions, where an input of the KNN model is based on one or more conditions of the set of conditions (e.g., throughput and/or payment metric), where the configuration does not include the unavailable resource.

Figure 5:
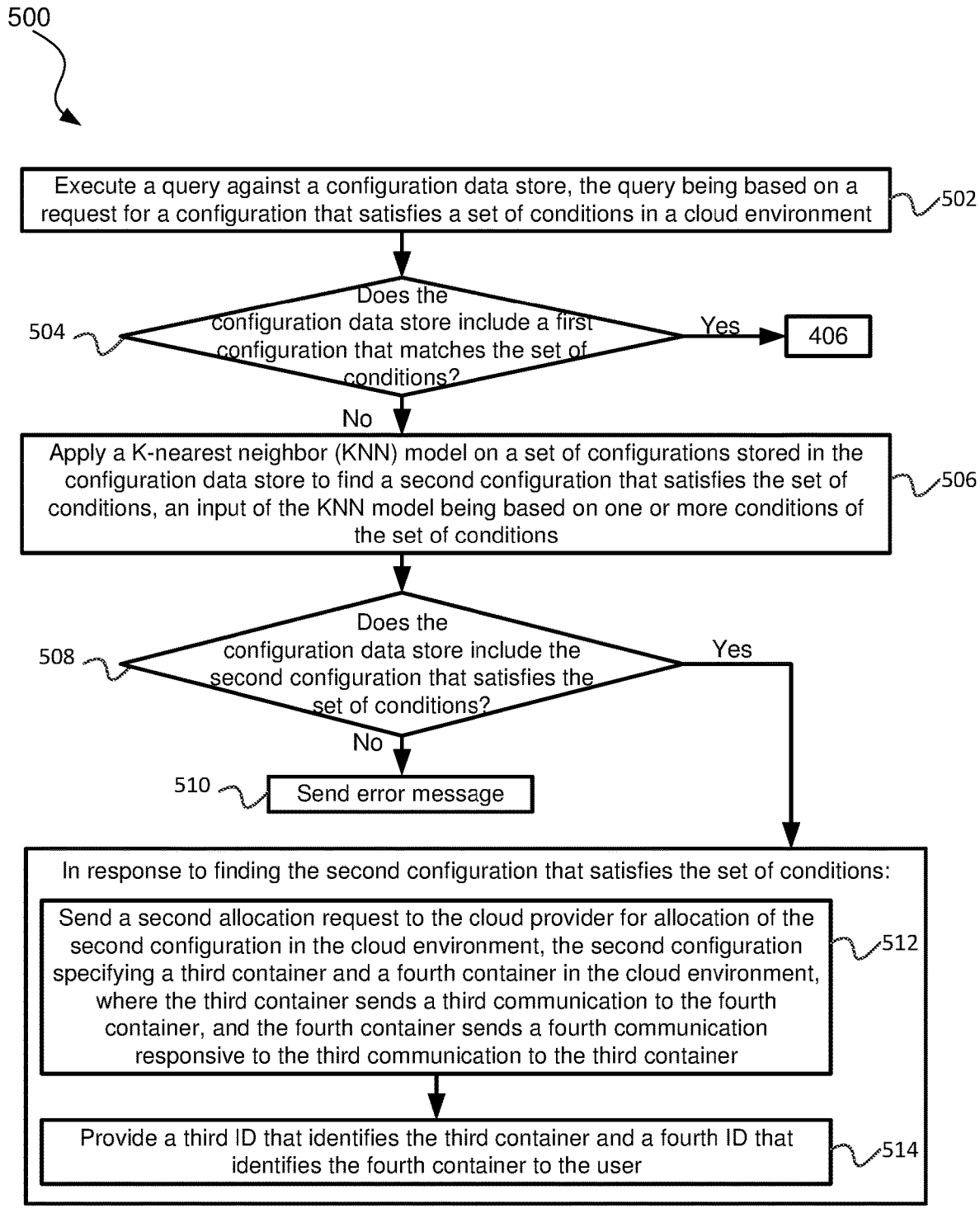
FIG. 5 is a flowchart illustrating an example method of providing a configuration for a multitier microservice architecture.

FIG. 5 is a flowchart illustrating an example method 500 of providing a configuration for a multitier microservice architecture. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 400 may be performed on system 100 illustrated in FIG. 1. The order of the actions described below may also be performed according to alternative orderings. In yet other examples, additional actions may be added and actions that are described may be removed.

Method 500 includes blocks 502, 504, 506, 508, 510, 512, and/or 514. In block 502, communications module 114 executes a query against configuration data store 112, the query being based on a request for a configuration that satisfies a set of conditions in a cloud environment. In block 504, database management server 118 determines whether configuration data store 112 includes a first configuration that matches the set of conditions. If so, method 500 proceeds to block 406 in method 400 (see FIG. 4). If not, method 500 proceeds to block 506, in which database management server 118 applies a KNN model on a set of configurations stored in configuration data store 112 to find a second configuration that satisfies the set of conditions, an input of the KNN model being based on one or more conditions of the set of conditions.

A configuration may satisfy a condition, without matching the condition. A configuration matches a condition if the entry specifying the configuration matches the condition. In an example referring to FIG. 2, if a condition specifies that the throughput is to be at least 100 queries per second and less than $0.10 per hour, the configuration specified in entries 206 and 212 match the set of conditions. In this example, container allocator 116 may request allocation of this specified configuration that provides 100 queries per second (which matches the throughput condition in configuration request 110) and costs $0.10 per hour (which matches the payment metric condition in configuration request 110). In another example, if a condition specifies that the throughput is to be at least 200 queries per second (which satisfies the throughput condition in configuration request 110) and less than $0.20 per hour (which satisfies the payment metric condition in configuration request 110), the configuration specified in entries 208 and 214 satisfy the set of conditions. In this example, container allocator 116 may request allocation of this specified configuration that provides 1,000 queries per second and costs $0.15 per hour.

In block 508, database management server 118 determines whether configuration data store 112 includes a second configuration that matches the set of conditions. If not, method 500 proceeds to block 510, in which communications module 114 sends an error message back to the user. In response to finding the second configuration that satisfies the set of conditions, method 500 proceeds to blocks 512 and 514. In block 512, container allocator 116 sends a second allocation request to cloud provider 104 for allocation of the second configuration in the cloud environment, the second configuration specifying a third container and a fourth container in the cloud environment, where the third container sends a third communication to the fourth container, and the fourth container sends a fourth communication responsive to the third communication to the third container. In this way, the user may be assured that the recommended configuration matches or at least satisfies the user's one or more conditions (e.g., budget constraints and/or throughput). In some examples, the set of conditions specifies a throughput that satisfies a throughput threshold and/or a payment metric for the respective configuration. In block 514, container allocator 116 provides a third ID that identifies the third container and a fourth ID that identifies the fourth container to the user. Container allocator 116 may receive the third and fourth IDs from cloud provider 104, which provides these resources for usage.

It is understood that additional blocks may be performed before, during, or after blocks 502, 504, 506, 508, 510, 512, and/or 514 discussed above.

Figure 6:
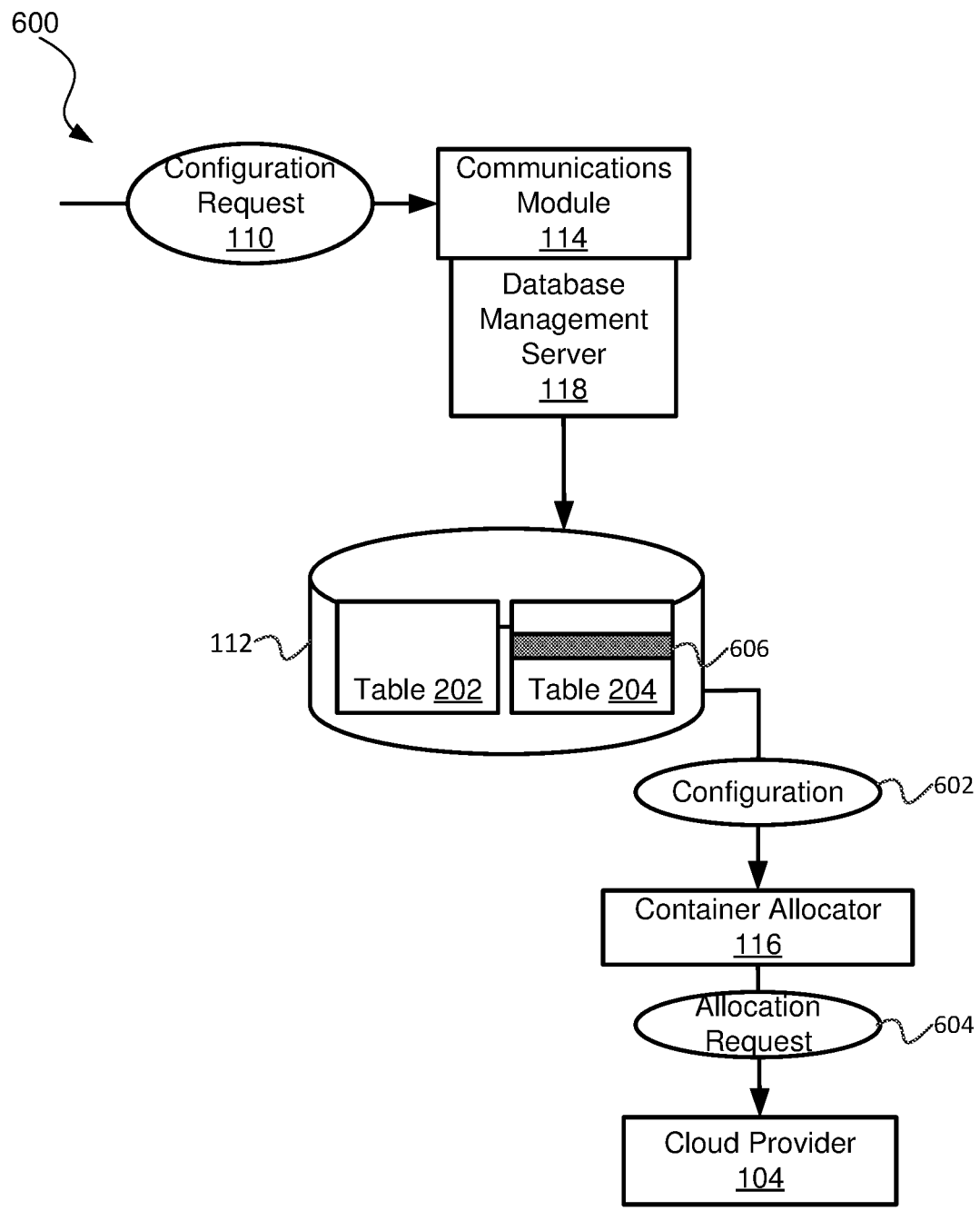
FIG. 6 is a diagram illustrating an example system for providing a configuration for a multitier microservice architecture.

FIG. 6 is a diagram illustrating an example system 600 for providing a configuration for a multitier microservice architecture. In FIG. 6, configuration data store 112 stores one or more configurations, each configuration specifying one or more containers located at a first tier of a multitier microservice architecture and one or more containers located at a second tier of the multitier microservice architecture. Communications module 114 receives configuration request 110 from a user for a configuration that satisfies a set of conditions in cloud environment 312. Database management server 118 searches configuration data store 112 for a configuration that matches the set of conditions. Database management server 118 may store an entry 606 that specifies a configuration 602 and provides an indication of whether configuration 602 satisfies one or more conditions.

In an example, a configuration 602 matches or satisfies the set of conditions and specifies first container 314 located at the first tier and second container 316 located at the second tier of the multitier microservices architecture. First container 314 sends first communication 320 to second container 316, and second container 316 sends second communication 322 responsive to first communication 320 to first container 314. In response to finding configuration 602 that matches or satisfies the set of conditions, container allocator 116 sends an allocation request 604 to cloud provider 104 for allocation of configuration 602 in the cloud environment. Additionally, container allocator 116 provides a first ID that identifies first container 314 and a second ID that identifies second container 316 to the user.

As discussed above and further emphasized here, FIGS. 1-6 are merely examples, which should not unduly limit the scope of the claims. In various implementations, resource allocation server 106 may run on a computing device device including one or more processors. The computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the computing device using a computer network (e.g. network 108). The network may be any type of network including a LAN, a WAN, an intranet, the Internet, a cloud, and/or any combination of networks thereof that is capable of interconnecting computing devices and/or computer programs in the system.

Additionally, the computing device may include a bus or other communication mechanism for communicating information data, signals, and information between various components of the computing device. The components may include an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (such as a keyboard, keypad, mouse, etc.). An audio I/O component may also be included to allow a user to use voice for inputting information by converting audio signals into information signals. Audio I/O component may allow the user to hear audio.

A transceiver or network interface may transmit and receive signals between the computing device and other devices via a communications link to the network. In an example, the transmission is wireless, although other transmission mediums and methods may also be suitable. A processor, which may be a micro-controller, digital signal processor (DSP), or other processing component, processes these various signals, such as for display on the client device or transmission to other devices via the communications link. The processor may also control transmission of information, such as cookies or IP addresses, to other devices.

Components of the computing device may also include a system memory component (e.g., RAM), a static storage component (e.g., ROM), and/or a disk drive. Resource allocation server 106 performs specific operations by one or more processors and other components by executing one or more sequences of instructions contained in the system memory component (e.g., memory). Logic may be encoded in a computer readable medium, which may refer to any medium that participates in providing instructions to the one or more processors for execution. Such a medium may take many forms, including but not limited to, non-volatile media, volatile media, and transmission media. In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in a non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In some examples, execution of instruction sequences (e.g., process flow 300, method 400, and/or method 500) to practice the present disclosure may be performed by the computing device. In various other examples of the present disclosure, a plurality of host machines coupled by the communications link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks, actions, or steps described herein may be changed, combined into composite blocks, actions, or steps, and/or separated into sub-blocks, sub-actions, or sub-steps to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of providing a configuration performed by a computing system, the method comprising:
   receiving a configuration request from a user for a configuration that satisfies a set of conditions in a cloud environment, a condition of the set of conditions specifying a throughput that satisfies a throughput threshold;
   searching a configuration data store for the configuration that satisfies the set of conditions in response to receiving the configuration request, the configuration data store storing information on multitier configurations provided by one or more cloud providers, each of the multitier configurations corresponding to at least one throughput parameter;
   providing to the user, based on searching the configuration data store, a multitier configuration that does not satisfy all of the set of conditions but corresponds to a throughput parameter which satisfies the throughput threshold, the multitier configuration that does not satisfy all of the set of conditions being determined by applying a K-nearest neighbor (KNN) model on the multitier configurations in the configuration data store, an input of the KNN model being based on one or more conditions of the set of conditions, the multitier configuration specifying a first container located at a first tier of a multitier microservice architecture and a second container located at a second tier of the multitier microservice architecture, each multitier configuration specifying one or more containers located at the first tier and one or more containers located at the second tier; and
   for one or more multitier configurations in the cloud environment:
      retrieving a first throughput for the respective configuration;
      populating a table with an entry specifying the respective configuration and the first throughput; and
      storing the table in the configuration data store.

2. The method of claim 1, wherein an application is decomposed into a first microservice and a second microservice.

3. The method of claim 2, wherein a first instance of the first microservice is run in the first container, and a second instance of the second microservice is run in the second container.

4. The method of claim 1, wherein a second condition of the set of conditions specifies a payment metric that satisfies a payment threshold.

5. The method of claim 4, further comprising:
   for one or more multitier configurations in the cloud environment, each multitier configuration specifying one or more containers located at the first tier and one or more containers located at the second tier:
      retrieving a first payment metric for the respective configuration; and populating the table with an entry specifying the respective configuration and the first payment metric.

6. The method of claim 1, further comprising:
searching a first website associated with a first cloud provider of the one or more cloud providers;
retrieving, based on searching the first website, information on one or more first multitier configurations provided by the first cloud provider;
searching a second website associated with a second cloud provider of the one or more cloud providers; and
retrieving, based on searching the second website, information on one or more second multitier configurations provided by the second cloud provider.

7. The method of claim 6, further comprising:
storing the information on the one or more first and second multitier configurations into the configuration data store.

8. The method of claim 1, wherein providing the multitier configuration includes allocating resources in the cloud environment in accordance with the multitier configuration.

9. A system for providing a configuration, comprising:
a processor;
a memory coupled to the processor, wherein the memory comprises instructions that, when executed by the processor, cause the processor to:
store information on multitier configurations provided by one or more cloud providers, each of the multitier configurations corresponding to at least one throughput parameter;
receive a configuration request from a user for a configuration that satisfies a set of conditions in a cloud environment, a condition of the set of conditions specifying a throughput that satisfies a throughput threshold;
search the configuration data store for the configuration that satisfies the set of conditions, wherein the database management server provides, based on searching the configuration data store, a multitier configuration that does not satisfy all of the set of conditions but corresponds to a throughput parameter which satisfies the throughput threshold to the user, the multitier configuration that does not satisfy all of the set of conditions being determined by applying a K-nearest neighbor (KNN) model on the configurations in the configuration data store, an input of the KNN model being based on one or more conditions of the set of conditions, wherein the multitier configuration specifies a first container located at a first tier of a multitier microservice architecture and a second container located at a second tier of the multitier microservice architecture, each multitier configuration specifying one or more containers located at the first tier and one or more containers located at the second tier; and
for one or more multitier configurations in the cloud environment:
retrieve a first throughput for the respective configuration;
populate a table with an entry specifying the respective configuration and the first throughput; and
store the table in the configuration data store.

10. The system of claim 9, wherein the first container sends a first communication to the second container, and the second container sends a second communication responsive to the first communication to the first container.

11. The system of claim 9, wherein the first container includes at least one of a compute resource, network resource, or storage resource.

12. The system of claim 11, wherein the compute resource is a central processing unit (CPU) cycle or random access memory (RAM) capacity.

13. The system of claim 9, wherein for one or more multitier configurations, the database management server obtains a payment metric for a respective multitier configuration and populates the table with an entry specifying the respective configuration and the payment metric.

14. A non-transitory machine-readable medium comprising a plurality of machine-readable instructions that when executed by one or more processors is adapted to cause the one or more processors to perform a method comprising:
receiving a configuration request from a user for a configuration that satisfies a set of conditions in a cloud environment, a condition of the set of conditions specifying a throughput that satisfies a throughput threshold;
searching a configuration data store for the configuration that satisfies the set of conditions in response to receiving the configuration request, the configuration data store storing information on multitier configurations provided by one or more cloud providers, each of the multitier configurations corresponding to at least one throughput parameter;
providing to the user, based on searching the configuration data store, a multitier configuration that does not satisfy all of the set of conditions but corresponds to a throughput parameter which satisfies the throughput threshold, the multitier configuration that does not satisfy all of the set of conditions being determined by applying a K-nearest neighbor (KNN) model on the multitier configurations in the configuration data store, an input of the KNN model being based on one or more conditions of the set of conditions, the multitier configuration specifying a first container located at a first tier of a multitier microservice architecture and a second container located at a second tier of the multitier microservice architecture, each multitier configuration specifying one or more containers located at the first tier and one or more containers located at the second tier; and
for one or more multitier configurations in the cloud environment:
retrieving a first throughput for the respective configuration;
populating a table with an entry specifying the respective configuration and the first throughput; and
storing the table in the configuration data store.

* * * * *